Figure 1:
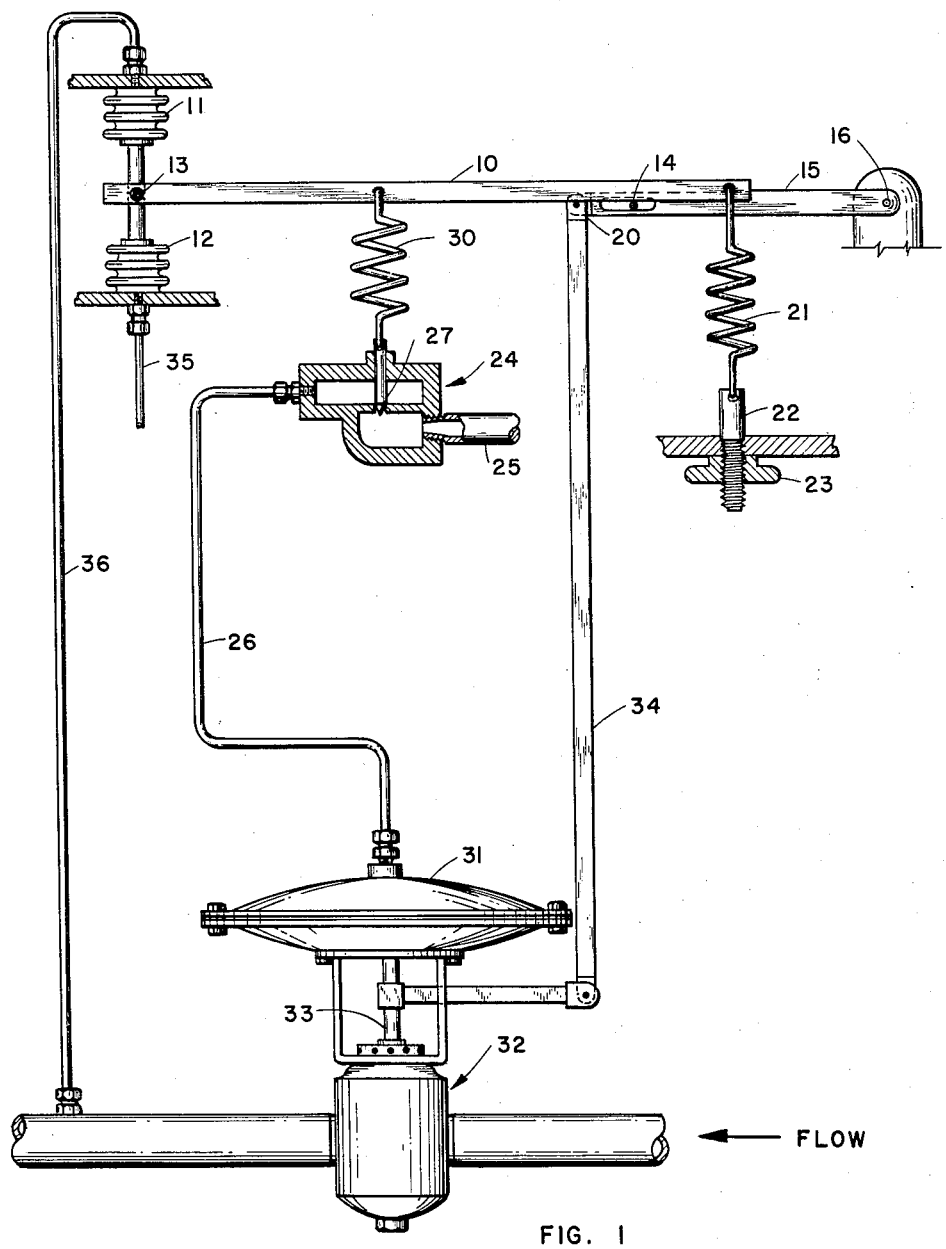
Figure 2:
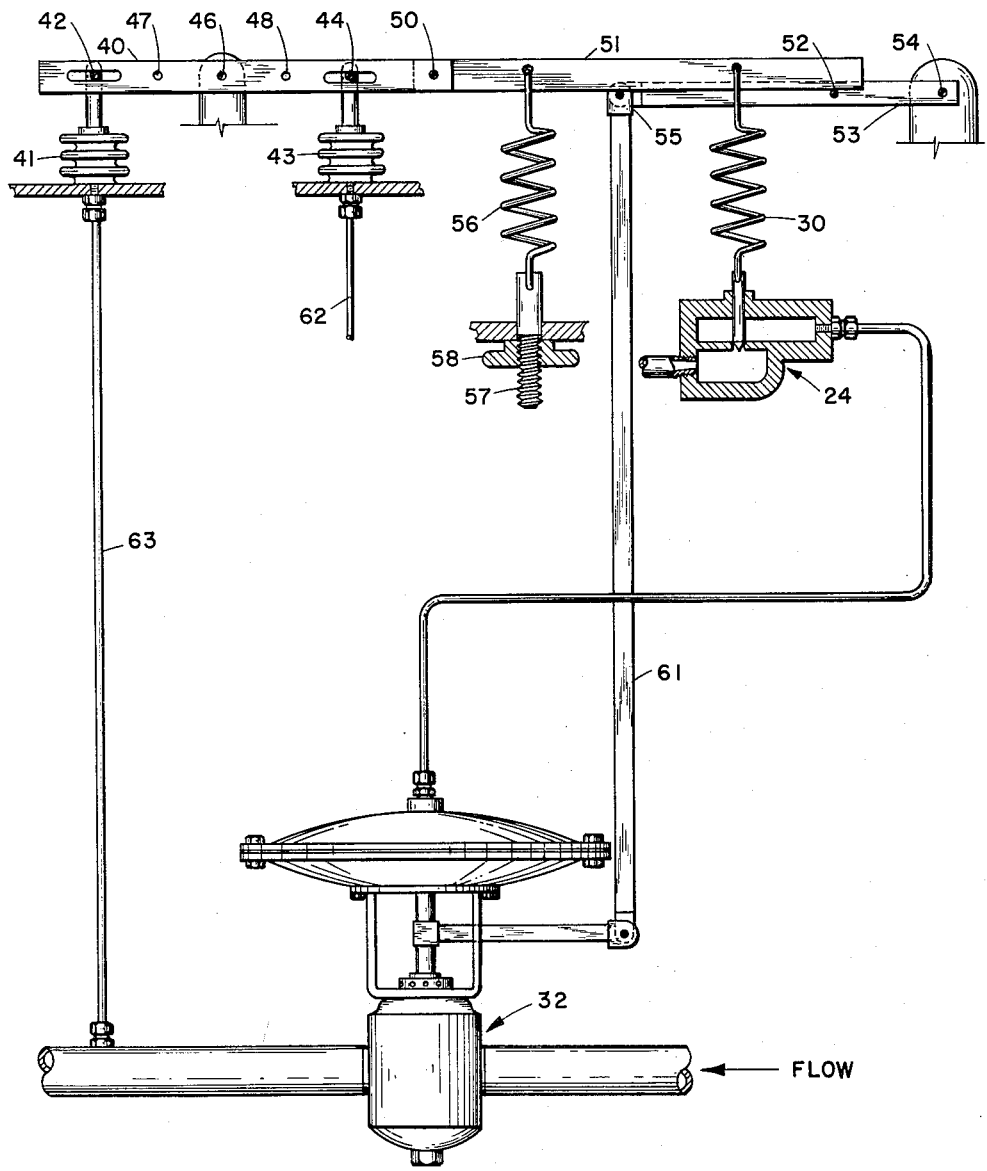

June 26, 1962 P. W. TAICLET 3,040,714
VALVE POSITIONER
Filed Aug. 12, 1958 2 Sheets-Sheet 1

INVENTOR:
PAUL W. TAICLET
BY: *James Todorovic*
HIS ATTORNEY

INVENTOR:
PAUL W. TAICLET
BY: James Todorovic
HIS ATTORNEY

3,040,714
VALVE POSITIONER
Paul W. Taiclet, Wood River, Ill., assignor to Shell Oil Company, a corporation of Delaware
Filed Aug. 12, 1958, Ser. No. 754,580
2 Claims. (Cl. 121—41)

This invention pertains to valve positioners and more particularly to a valve positioner actuated by either the controlling instrument, the downstream pressure, or a combination of both and adapted to position a pilot valve which in turn controls a pressure operated valve.

Valve positioners are used to give a more positive drive or repositioning force for a control valve, thus overcoming the friction due to the valve packing and sticking to the inner valve. In the absence of a valve positioner, friction in the valve frequently results in over-correction by the controlling instrument and consequently, cycling of the flow controlled by the valve. Most valve positioners utilize a spring loaded bellows which receives a fluid pressure signal from the controlling instrument and deflects a beam in proportion to the signal received. The motion of the beam is used to position a pilot valve which controls the admission of a pressurized fluid to the actuating motor of the control valve. The beam is connected to the valve motor through appropriate linkages so that the beam will be returned to a balanced condition upon repositioning of the control valve.

Two types of control valves are normally used with valve positioners, both utilizing a flexible diaphragm subject on one side to the fluid pressure from the positioner and on the other side to a balancing force. In one type of valve the balancing force is a spring, in another it is the downstream pressure, but of course in both valves the movement of the diaphragm is used to position the valve. In the type of valve using downstream pressure to balance the valve diaphragm any leakage past the diaphragm means that the system fluid will flood the valve positioner. In cases were the system fluid is corrosive considerable damage to the positioner could result. While a spring balanced diaphragm overcomes the above disadvantage of pressure balanced diaphragms it is impossible to balance the control against the downstream pressure in this type of valve.

Control valves of the above type in combination with valve positioners are usually utilized to control flows in the various process streams of a chemical plant. In many installations the plant control determines the pressure or flow in the various streams and then supplies the necessary correction signal to the valve positioner. The valve positioner then repositions the control valve to effect the desired change in the process stream pressure or flow. Flow in any fluid stream of course varies with the pressure, thus balancing of the control signal against the downstream pressure is very desirable if possible. By balancing the downstream pressure against the control signal the downstream pressure will be maintained at substantially the exact value desired.

Accordingly, it is the principal object of this invention to provide a valve positioner in which the system fluid is isolated from the diaphragm of the valve motor while balancing the system pressure against the downstream pressure.

Another object of this invention is to provide a valve positioner which can accommodate a wide range of system pressures while utilizing an operating fluid having a very narrow pressure range.

A further object of this invention is to provide a valve positioner with a follow up means which returns the main beam of the positioner to a balanced condition after it has been displaced by a change in the pressure supplied by the controlling instrument or by a change in the downstream pressure.

The above objects and other advantages of this invention are obtained by providing a valve positioner utilizing a main control beam and two pressure responsive members which are connected to the main control beam. The pressure responsive members are connected to the main beam so that they apply their resulting forces in opposition to each other.

The main control beam is pivoted about a fulcrum which is carried by an auxiliary beam and biased so as to resist the movement caused by one of the pressure responsive members supplied with fluid pressure from the low pressure side of the valve being controlled by a positioner. The movement of the main beam is used to control the position of a pilot valve which in turn controls the flow of a pressurized fluid supplied to the valve motor to operate the valve.

The above objects and other advantages of this invention will be more easily understood from the following detailed description when taken in conjunction with the attached drawing in which:

FIGURE I is a schematic representation of one embodiment of this invention; and

FIGURE II is a schematic representation of a second embodiment of this invention.

Referring now to FIGURE I there is shown a main beam 10 which is used to position a pilot valve 24. The pilot valve in turn controls a source of constant pressure fluid to supply a fluid pressure to operate the control valve 32, the pressure supplied being proportional to the movement of the beam. The control valve 32 may be of any well known type which utilizes a fluid operated motor to position the moveable valve element and is shown as a piston operated valve. The piston consists of a spring loaded diaphragm contained within the diaphragm chamber 31 on the top of the valve.

Two pressure responsive elements 11 and 12 are disposed on opposite sides of the main beam 10 and connected to a common point 13 on the beam adjacent the left hand end of the beam. The two pressure responsive elements are shown as being expanded bellows type elements but many other suitable pressure responsive elements may be used, such as diaphragms or pistons. The right hand end of the beam 10 is pivoted about a fulcrum member 14 which is carried by an auxiliary beam 15. The auxiliary beam 15 is rotatably supported at its right-hand end by means of a fixed pivot pin 16 while the left-hand end of the auxiliary beam is pivoted about a pivot pin 20. The right-hand end of the main beam 10 is biased into engagement with the fulcrum 14 by means of a tension spring 21 whose free end is connected to an adjusting shaft 22. A suitable nut 23 threads over the end of the shaft 22 so that the tension of the spring 21 may be varied as desired.

The movable element 27 of the pilot valve 24 is connected to the main beam by means of a load limiting spring 30 which is attached to the beam at a point between the common point 13 and the fulcrum member 14. The inlet of the pilot valve 24 is connected by means of a conduit 25 to a fluid pressure source having a constant pressure (not shown) while the outlet of the pilot valve is connected by means of a conduit 26 to the diaphragm chamber 31 of the control valve 32. The control valve 32 may be of any type of fluid pressure operated valve, but is preferably of piston operated type in which a diaphragm is subject on one side to the pressure of a control fluid and on the other side to a spring force for positioning the movable valve element. Of course, the valve 32 should be provided with a suitable bleed having a flow restriction therein to permit the fluid pressure to bleed from one side of the diaphragm. This bleed is not shown in FIGURE I since its use in this type of valve is well known. The valve stem 33 of the control valve 32 is connected to both the movable valve element and a suitable follow up linkage 34 which acts as the stationary support for the pivot pin 20 described above. The follow up linkage 34 acts to feed back a portion of the control valve movement to the valve positioner to assist in returning the main beam 10 to a balanced condition. The pressure responsive member 12 is connected by means of conduit 35 to the control pressure which is supplied by the controlling instrument (not shown) while the pressure responsive element 11 is connected to the low pressure or downstream side of the control valve 32 by means of a conduit 36.

When the above valve positioning mechanism is operated by supplying a fluid whose pressure is controlled by the controlling instrument to the pressure responsive member 12, the left-hand end of the beam will move upward. This movement will open the pilot valve 24 to supply fluid pressure to the diaphragm chamber 31 of the control valve 32. The pressure supplied to the diaphragm chamber 31 will overcome the force of the diaphragm spring and open the control valve 32. As the control valve opens the pressure on the down stream or low pressure side of the valve will increase. This increased pressure will be supplied by means of the conduit 36 to the pressure responsive member 11, thus, resisting further upward movement of the main beam 10 by the pressure responsive element 12. Also, as the control valve 32 opens, the follow up member 34 will move downwardly, thus, lowering the pivot pin 20 and the fulcrum member 14 which is secured to the auxiliary beam 15. This will assist in returning the main beam 10 to a balanced condition and maintain the pilot valve 24 in the proper position to maintain the desired process pressure on the low pressure side of the control valve 32. After the control valve has been positioned any change in the downstream pressure will change the pressure in the bellows 11. This change in the pressure in bellows 11 will cause the main beam to reposition the pilot valve 24 to change the pressure of the fluid supplied to the diaphragm chamber 31 and return the control valve 32 to the desired position. The follow up member 34 will again rebalance the main beam 10 to return the positioner to a position of equilibrium.

Referring now to FIG. II there is shown a second embodiment of this invention in which the main beam 40 is pivoted about a fixed point 46. The fixed point 46 can be adjusted to various locations, such as 47 and 48 either by moving the pivot point a definite amount or by using other types of adjustments such as a threaded shaft and nut arrangement which is fixed to the beam and forms the pivot point.

The pressure responsive members 41 and 43 are disposed on opposite sides of the pivot point and are connected to the main beam at points 42 and 44 respectively. The pressure responsive member 43 is connected to the controlling instrument by a conduit 62 while the pressure responsive member 41 is connected to the low pressure or downstream side of the control valve 32 by a conduit 63. The right-hand end of the beam is rotatably connected to the left-hand end of a floating beam 51 by means of a pin 50. The other end of the floating beam is pivoted about a pin 52 which is carried by the auxiliary beam 53. The movable element of the pilot valve 24 is connected to the floating beam 51 by means of the load limiting spring 30. The floating beam 51 is also biased by means of a tension spring 56 so as to resist an upward movement caused by the expansion of the pressure responsive element 43. The tension of the spring 56 may be adjusted by means of the threaded shaft 57 and nut 58. The auxiliary beam 53 is rotatably supported at its right-hand end by a pin 54 while its left-hand end is supported by the pivot pin 55. The pivot pin 55 in turn is supported by a follow up member 61 which is positioned by the valve stem of the control valve 32.

The above-described embodiment operates in substantially the same manner as that shown in FIG. I. As fluid pressure is admitted to the pressure responsive element 43 from the controlling instrument the right-hand end of the main beam 40 and the left-hand end of the floating beam 51 will move upwardly. This movement will open the pilot valve 24, thus admitting fluid pressure to the diaphragm chamber of the control valve 32. As the control valve 32 opens, the pressure on the downstream side will increase, thus, increasing the fluid pressure to the pressure responsive member 41. The member 41 will then tend to resist the force of the pressure responsive member 43 and return the main beam 40 to a balanced position. The auxiliary beam 53 will be lowered by the follow up member 61 in the same manner as described above for FIG. I to return the main beam 40 to a balanced condition to maintain the desired pressure on the low pressure side of the control valve 32.

While but two specific embodiments of this invention have been described in detail, it is susceptible to many additional modifications and changes within its broad spirit and scope and accordingly should not be limited to the specific details described above.

I claim as my invention:

1. A valve positioner to position a valve to control the flow of a fluid comprising: a pressure operated servomotor; a pilot valve, the inlet of said pilot valve being connected to a source of pressurized fluid and the outlet of said pilot valve being connected to said pressure operated servomotor; said pilot valve being positioned by the movement of a first beam member; first and second pressure responsive members connected to said first beam member in opposition to each other; a resilient force means connected to said beam to resist movement of said first beam by said first pressure responsive member; said first pressure responsive member being responsive to the downstream pressure of a fluid being controlled and said second pressure responsive member being connected to a control pressure; one end of said first beam member being pivotally supported by a followup means including a second beam member, said second beam member having a fixed pivot at one end and rotatably connected to a movable member of said pressure operated servomotor at the other end.

2. A valve positioner to position a valve to control the flow of a fluid comprising: a pressure operated servomotor; a pilot valve, the inlet of said pilot valve being connected to a source of pressurized fluid, the outlet of said pilot valve being connected to said pressure operated servomotor; first and second pressure responsive members connected to a first beam member at spaced points in opposition to each other; said first beam member in addition being pivoted between said spaced points, the position of the pivot of said first beam being adjustable along the axis of said first beam; one end of said first beam being rotatable connected to one end of a floating beam, the other end of said floating beam being pivotally supported by a second beam; said floating beam being connected to said pilot valve to control the position of said pilot valve; a resilient means connected to said floating beam to resist movement of said floating beam by said first pressure responsive member; said second beam pivotally supported at one end and rotatably connected to a movable element of said pressure operated servomotor at the othre end; said first pressure responsive member being connected to a control pressure and said second pressure responsive member being responsive to the pressure of a fluid being controlled.

(References on following page)

References Cited in the file of this patent

UNITED STATES PATENTS

| | | |
|---|---|---|
| 2,013,222 | Thomas | Sept. 3, 1935 |
| 2,264,262 | Erbguth | Nov. 25, 1941 |
| 2,441,044 | Tate | May 4, 1948 |
| 2,583,006 | Niesemann | Jan. 22, 1952 |
| 2,672,151 | Newbold | Mar. 16, 1954 |
| 2,851,048 | Hutchinson | Sept. 9, 1958 |

FOREIGN PATENTS

| | | |
|---|---|---|
| 555,740 | Germany | of 1932 |